(12) United States Patent
Yang et al.

(10) Patent No.: US 9,083,947 B2
(45) Date of Patent: Jul. 14, 2015

(54) VIDEO ENCODER, VIDEO DECODER, METHOD FOR VIDEO ENCODING AND METHOD FOR VIDEO DECODING, SEPARATELY FOR EACH COLOUR PLANE

(75) Inventors: Ji Heng Yang, Beijing (CN); Li Li Zhao, Beijing (CN); Zhi Bo Chen, Beijing (CN)

(73) Assignee: Thomson Licensing, Issy les Moulineaux (FR)

( * ) Notice: Subject to any disclaimer, the term of this patent is extended or adjusted under 35 U.S.C. 154(b) by 418 days.

(21) Appl. No.: 13/575,122

(22) PCT Filed: Jan. 25, 2010

(86) PCT No.: PCT/CN2010/000108
§ 371 (c)(1),
(2), (4) Date: Jul. 25, 2012

(87) PCT Pub. No.: WO2011/088594
PCT Pub. Date: Jul. 28, 2011

(65) Prior Publication Data
US 2012/0307897 A1 Dec. 6, 2012

(51) Int. Cl.
*H04N 7/12* (2006.01)
*H04N 11/02* (2006.01)
*H04N 11/04* (2006.01)
(Continued)

(52) U.S. Cl.
CPC ... *H04N 19/00315* (2013.01); *H04N 19/00018* (2013.01); *H04N 19/00139* (2013.01); *H04N 19/00278* (2013.01); *H04N 19/00369* (2013.01); *H04N 19/00551* (2013.01);
(Continued)

(58) Field of Classification Search
None
See application file for complete search history.

(56) References Cited

U.S. PATENT DOCUMENTS 6,785,425 B1 8/2004 Feder et al.
7,933,337 B2 4/2011 Srinivasan et al.
(Continued)

FOREIGN PATENT DOCUMENTS

AU 2003264580 6/2004
CN 101243685 8/2008
(Continued)

OTHER PUBLICATIONS

Kobayashi et al,. "Lossless Compression Techniques of Color Static Images", Matsushita Technical Journal, vol. 46, No. 2 (Apr. 2000 issue), pp. 99-105.
(Continued)

*Primary Examiner* — Dave Czekaj
*Assistant Examiner* — Nam Pham
(74) *Attorney, Agent, or Firm* — Robert D. Shedd (57) ABSTRACT

High-fidelity video coding nowadays tends to adopt the RGB coding for directly reducing RGB inter-color redundancy without color space conversion. A known method uses a blockbased inter-color compensation algorithm for removing inter-color redundancy on RGB color planes by defining the correlation between color planes within each coding block as a linear model of slope and offset parameters, codes the base plane block and then predicts the other two color blocks from the base plane block. However, for most coding blocks the texture within a component block varies quite much. A new method for improved video coding uses adaptive segmentation of the base color component block, corresponding segmentation of the other color component blocks and individual slope and offset parameters for predicting each segment.

12 Claims, 7 Drawing Sheets

(51) Int. Cl.
*H04N 19/50* (2014.01)
*H04N 19/186* (2014.01)
*H04N 19/136* (2014.01)
*H04N 19/196* (2014.01)
*H04N 19/463* (2014.01)
*H04N 19/103* (2014.01)
*H04N 19/176* (2014.01)
*H04N 19/11* (2014.01)
*H04N 19/61* (2014.01)

(52) U.S. Cl.
CPC ... *H04N 19/00569* (2013.01); *H04N 19/00042* (2013.01); *H04N 19/00781* (2013.01)

(56) References Cited

U.S. PATENT DOCUMENTS

| | | | |
|---|---|---|---|
| 8,150,178 | B2 | 4/2012 | Song et al. |
| 2005/0013370 | A1 | 1/2005 | Kim et al. |
| 2007/0082195 | A1 | 4/2007 | Goecke et al. |
| 2007/0223021 | A1 | 9/2007 | Song et al. |
| 2008/0019597 | A1 | 1/2008 | Song et al. |
| 2008/0043840 | A1 | 2/2008 | Song et al. |
| 2009/0322778 | A1* | 12/2009 | Dumitras et al. ............. 345/582 |

FOREIGN PATENT DOCUMENTS

| | | |
|---|---|---|
| CN | 101321277 | 12/2008 |
| CN | 101496406 | 7/2009 |
| EP | 1909508 | 4/2008 |
| JP | 2006244119 | 9/2006 |
| JP | 2009534876 | 9/2009 |
| WO | WO-2008004769 | 1/2008 |

OTHER PUBLICATIONS

Song et al., "Block Adaptive Inter-Color Compensation Algorithm for RGB 4:4:4 Video Coding", IEEE Transactions on Circuits and Systems for Video Technology, vol. 18, No. 10, Oct. 28, 2008, pp. 1447-1451.
Kim et al.,"Residue Color Transform" JVT of ISO/IEC MPEG & ITU-T VCEG, JVT-L025, Redmond, WA, USA, Jul. 17-23, 2004.
Kim et al., "Color Format Extension", JVT of ISO/IEC MPEG & ITU-T CVEG, JVT-H018, Geneva, Switzerland, May 23-27, 2000.
Kim et al., "Inter-plane Prediction for RGB Coding II", JVT-J017, VT of ISO/IEC MPEG & ITU-T VCEG, Waikoloa, Hawaii, USA, Dec. 8-12, 2003.
Kim et al., "High-Fidelity RGB Video Coding Using Adaptive Inter-Plane Weighted Prediction", IEEE, vol. 19, No. 7, Jul. 2009.
Kim et al., "Inter-Plane Prediction for RGB Video Coding", 2004 International Conference on Image Processing (ICIP), vol. 2., 2004, pp. 785-788.
Lee et al., "A new intra prediction method using channel correlations for the H.264/AVC intra coding", 2009 Picture Coding Symposium (PCS), May 6, 2009, Chicago, IL USA, pp. 1-4.
Kobayashi et al., "Lossless Compression Techniques of Color Static Images", Matsushita Technical Journal, vol. 46, No. 2 (Apr. 2000 issue), pp. 99-105.
Search Rept:Nov. 11, 2010.

* cited by examiner

VIDEO ENCODER, VIDEO DECODER, METHOD FOR VIDEO ENCODING AND METHOD FOR VIDEO DECODING, SEPARATELY FOR EACH COLOUR PLANE

This application claims the benefit, under 35 U.S.C. §365 of International Application PCT/CN2010/000108, filed Jan. 25, 2010, which was published in accordance with PCT Article 21(2) on Jul. 28, 2011 in English.

FIELD OF THE INVENTION

This invention relates to video encoding and video decoding, wherein different colour planes are encoded/decoded separately.

BACKGROUND

High-fidelity video coding tends to adopt RGB coding, which directly reduces RGB inter-color redundancy without external color space conversion. RGB coding is desirable for high resolution (HD) and accurate definition of saturation and hue. Several coding tools that support 4:4:4 format in RGB color space have been developed to improve RGB-domain 4:4:4 video coding efficiency. E.g. "Residue Color Transform", ISO/IEC JTC1/SC29/WG11 and ITU-T Q6/SG16, Document JVT-L025, July 2004 by Woo-Shik Kim, Dmitry Birinov, and Hyun Mun Kim uses a residual color transform for 4:4:4 RGB coding, which first does intra/inter prediction to red (R), green (G) and blue (B) planes following the same procedure as H.264/AVC, and then adopts YCoCg-R color transform for the residual color transform. This has the disadvantage that a color residue transform generates much color distortion.

Some methods have been proposed to avoid color distortion resulting from the color space transform. The same authors as above present in "Color Format Extension", ISO/IEC JTC1/SC29/WG11 and ITU-T Q6/SG16, Doc. JVT-H018, May 2003 and in "Inter-plane Prediction for RGB Coding II," ISO/IEC JTC1/SC29/WG11 and ITU-T Q6/SG16, Doc. JVT-J017, December 2003 an inter-plane prediction (IPP) coding method for RGB coding. In this proposal, intra/inter prediction is first done to the three color components, and then the reconstructed G plane residue is used as a predictor block for each R and B residue. Finally, the predicted R residue and B residue follow the same coding procedure of the existing JVT specification as the G residue does. IPP coding avoids the color distortion resulting from the color space transform as well as coding error propagation. However, there are some cases where the correlation between color components is decreased after inter/intra prediction. In such cases IPP works poorly.

In another proposal, "Block Adaptive Inter-Color Compensation Algorithm for RGB 4:4:4 Video Coding", IEEE Trans. Circuits and systems for video technology, vol. 18, no. 10, pp. 1447-1451, October 2008 by Byung Cheol Song, Yun Gu Lee and Nak Hoon Kim presents a block-based inter-colour compensation algorithm for removing inter-colour redundancy on RGB colour planes for video coding. It defines the correlation between colour planes within each coding block as a linear model of a slope and an offset parameter, codes the base colour plane block using the H.264/AVC standard, and then performs a weighted prediction to estimate the other two colour blocks from the base colour plane block. It uses a single common H.264 intra prediction to predict pixel values for calculating the offsets in its defined linear model for all blocks in a B/R plane. However, this predictor accuracy is often poor, and thus degrades linear prediction accuracy.

Further, Yong-Hwan Kim, Byeongho Choi, and Joonki Paik propose in "High-Fidelity RGB Video Coding Using Adaptive Inter-Plane Weighted Prediction" IEEE Trans. Circuits and systems for video technology, vol. 19, no. 7, pp. 1051-1056, July 2009 to use both intra-plane and inter-plane correlation between G/B, G/R and B/R planes in a coding block. For these two approaches, all of the sub-blocks within each colour component block share a single slope value. This is based on the assumption that the texture of a colour component within a current block is homogeneous and strongly correlated. However, for most coding blocks the texture within a component block varies quite much.

SUMMARY OF THE INVENTION

It has been found that the coding efficiency in predicting a component block, such as a macroblock, can be improved by using individual slope and offset parameters for adaptive segments of the component block, instead of using a single slope parameter. The adaptive segments are determined by edge detection, such that each segment has a more homogeneous or similar texture than the complete component block.

The present invention uses this recognition in that a base colour plane is defined, texture segmentation is performed for a picture unit of the base colour plane, wherein one or more regions of relatively similar/homogeneous texture are determined within the picture unit, the texture regions are applied to at least one of the remaining colour planes of the picture unit, and each region of the remaining colour plane is linearly predicted from its corresponding region in the base colour plane. A picture unit or image unit is e.g. a block, a macroblock (MB), a frame or a complete picture. In principle these MBs can have any size or shape. Usually, a MB is square and has 16×16 pixels. Note that "region" and "segment" are used as equivalents herein.

In one aspect, a method for encoding video on image unit level separately for each colour plane comprises steps of selecting a base colour plane, encoding and reconstructing the image unit's base colour plane, performing texture segmentation on the base colour plane of the reconstructed image unit, wherein at least two texture segments are determined, separating at least one of the other colour planes of the image unit into texture segments, using the texture segments that were determined for the base colour. Further steps are determining, for each of the texture segments or regions, a linear correlation (in terms of luminance or intensity) between the reconstructed base colour plane and the at least one other colour plane, predicting pixels in a texture segment of said at least one other colour plane of the image unit from pixels of a corresponding texture segment of the image unit's base colour plane, based on said linear correlation obtained for the respective texture segment, determining a residual (e.g. by comparing the predicted pixels with the original pixels and determining the difference as being a residual), and encoding the residual and information defining the linear correlation. Said correlation can be expressed by a weight factor and an offset, but in principle, also other values can be used that define the linear correlation.

The base colour plane can be selected for an image portion, or for an image or an image sequence. In one embodiment, the step of encoding the image unit's base colour plane uses predictive intra-coding. In another embodiment, the base colour plane is encoded using inter-coding based on a reconstructed previously encoded/decoded image.

In another aspect, a video encoder for encoding colour planes separately on image unit level (i.e. a macroblock, a frame or a picture) comprises
a selector for selecting a base colour plane for an image unit, an image or an image sequence,
a codec for encoding and reconstructing the image unit's base colour plane,
a segmentation unit for performing texture segmentation on the reconstructed image unit's base colour plane, wherein at least two texture segments are determined,
a separator for separating at least one of the other colour planes of the image unit into texture segments, wherein the texture segments that were determined for the base colour are used,
a correlator for determining, for each of the texture segments, a (luminance or intensity) correlation between the reconstructed base colour plane and the at least one other colour plane, wherein values are obtained that define a linear correlation,
a predictive coder having a predictor for predicting pixels in a texture segment of said at least one other colour plane of the image unit from pixels of the corresponding texture segment of the base colour plane, based on said values that define a linear correlation and that were obtained for this particular texture segment, and having a discriminator for determining a residual, e.g. a comparator for comparing the original pixels of the other colour plane with the predicted pixels and determining the difference as being a residual, and
an encoder for encoding the residual and information that defines the linear correlation.

In one embodiment, the codec for encoding and reconstructing the image unit's base colour plane performs intra-coding.

In another aspect, a method for decoding video data being encoded on image unit level separately for different colour planes, wherein an image unit is e.g. a block, a macroblock, a frame or a picture, comprises steps of
extracting from the encoded video data a first data block comprising data of an encoded base colour plane of the image unit,
extracting from the encoded video data a second data block comprising data of an encoded second colour plane of said image unit, and extracting from the encoded video data correlation data defining weight factors and offsets of at least two linear correlation functions,
intra-decoding the first data block, wherein a reconstructed base colour plane is obtained,
performing texture segmentation on the reconstructed image unit's base colour plane, wherein at least two texture segments are determined,
separating at least a second colour plane of the image unit into at least two texture segments, using the texture segments that were determined for the base colour plane,
for each of the at least two texture segments of the second colour plane, determining from said data defining a weight factor and an offset an intensity correlation function between the reconstructed base colour plane and the second colour plane,
predicting each of the at least two texture segments of the second colour plane from the respective texture segments of the base colour plane, using the respective correlation function determined for the segment, and
reconstructing the image unit of the second colour plane, wherein residual data extracted from the second data block are combined with said predicted texture segments of the second colour plane.

In one embodiment, the first data block that was extracted from the encoded video data of the image unit comprises data of an intra-coded base colour plane.

In another aspect, a video decoder for video data being encoded on image unit level separately for different colour planes, comprises
first extraction means for extracting from the encoded video data a first data block comprising data of an encoded base colour plane of the image unit,
second extraction means for extracting from the encoded video data a second data block comprising data of an encoded second colour plane of said image unit, and third extraction means for extracting from the encoded video data correlation data defining weight factors and offsets of at least two correlation functions,
first codec for intra-decoding the first data block, wherein a reconstructed base colour plane is obtained,
segmentation unit for performing texture segmentation on the reconstructed image unit's base colour plane, wherein at least two texture segments are determined,
segmentation applying unit for separating at least a second colour plane of the image unit into at least two texture segments, using the texture segments that were determined for the base colour plane,
determining unit for determining, for each of the at least two texture segments of the second colour plane, from said data defining a weight factor and an offset an intensity correlation function between the reconstructed base colour plane and the second colour plane,
prediction unit for predicting each of the at least two texture segments of the second colour plane from the respective texture segments of the base colour plane, using the respective correlation function determined for the segment, and
reconstructing unit for reconstructing the image unit of the second colour plane, wherein residual data extracted from the second data block are combined with said predicted texture segments of the second colour plane.

In one embodiment, the first data block that was extracted from the encoded video data of the image unit comprises data of an intra-coded base colour plane, and the first codec comprises a decoder for intra-decoding.

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in
FIG. 1 exemplary correlation between R and G components in a MB.

DETAILED DESCRIPTION OF THE INVENTION

Figure 1:
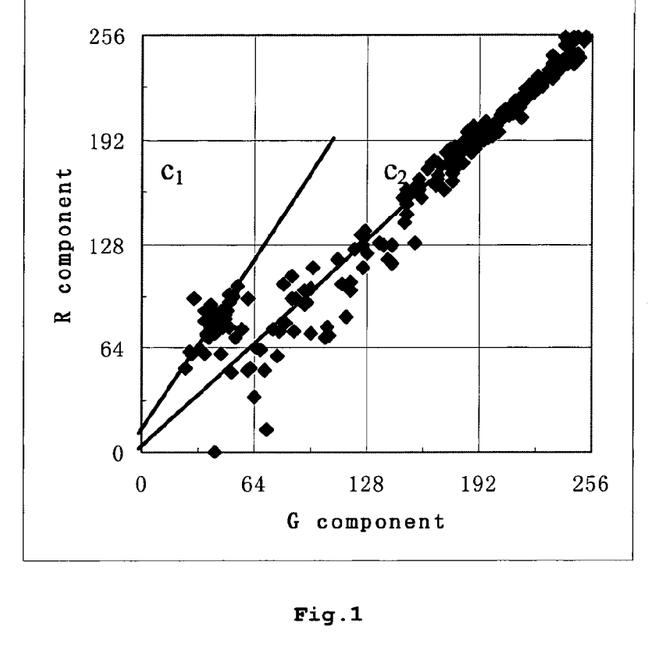

Substantial texture redundancy exists among the G, R and B components of a picture, since the texture distribution in the colour components is quite similar to each other. In most occasions, the texture within a single block differs much, so that there always exist several different texture regions in a block. Since e.g. the existing JVT specification divides a frame into MBs and individually encodes each MB, we investigate the correlation between colour components on MB basis. FIG. 1 illustrates the inter-colour correlation between R and G components at two exemplary MBs in a high definition video frame (it is the 28,26$^{th}$ MB in the first frame of the well-known "traffic" sequence). The R and G components of this MB are highly correlated, following mainly one out of two correlation groups $c_1, c_2$. The data within this MB is mainly divided into two parts with different slopes, based on different texture distribution. Besides, it can be seen that each part has strong correlation between R and G components. The present invention removes much of this texture redundancy by using a base colour component to predict the other components. The prediction may use separate weighted parameters for each texture region within a colour component during an intra-coding phase. Thus, the invention avoids colour distortion as generated by colour space conversion, removes texture redundancy existing among the (usually three) colour components, and fully uses the texture correlation of the different colour components.

In the following embodiments, the present invention proposes a texture based adaptive inter-colour prediction approach to intra-frame coding for RGB 4:4:4 format, which treats the green (G) component as base colour component and predicts red and blue (R/B) components from the G component. The prediction uses different weighting factors for different texture regions. The proposed scheme can be implemented on different levels, e.g. the MB (16×16 pixel block) level and the frame level. It is to be noted here that the invention can also be used on other MB sizes, such as 8×16, 32×32, 64×64 etc. The picture unit should not be smaller than 8×8 pixels, since then the below-described segmentation becomes too difficult.

In an embodiment, a G MB is encoded following the same intra prediction method as used for MB level in the existing JVT specification. After encoding and reconstructing the G MB, the reconstructed G MB is then used to perform texture segmentation, generating one or more texture regions. After that, the R and B MBs are separated into the same texture regions as the G component, and pixels in each texture region are predicted from the pixels in the corresponding G texture region. The prediction uses particular prediction weighting factor that are determined individually for each texture region.

In another embodiment, a G plane is encoded following the same intra-prediction method as used for frame level in the existing JVT specification. The reconstructed G plane (which has frame size) is separated into an adaptive number of regions, based on the texture distribution. After that, the R and/or B planes (having frame size) are separated into the same texture regions as the G plane. Then the pixels in a texture region of an R/B block (of MB size) are predicted from the pixels in the corresponding region of the G block (on MB size).

That is, the texture segmentation may be performed on various picture units, such as MBs or frames. It may use edge detection and/or other well-known image analysis methods, and generates or rather identifies one or more texture regions.

In the following, an embodiment of texture segmentation on MB level is described. The colour components are exemplarily encoded in the order of G plane, B plane and R plane, as in H.264/AVC. That is, G is the base colour plane. In other embodiments, other sequence orders are possible. The base colour plane, consisting of a number of MBs, is in a first phase encoded following the intra-prediction method specified in H.264/AVC. After that, texture segmentation is done to the corresponding reconstructed G MB. Then the B plane, consisting of the same number of MBs as the G and R planes, is ready to be encoded. The corresponding B MB is selected as current MB. When referring to "corresponding" pixels, blocks, or MBs, we mean the pixels, blocks or MBs that have the same coordinates as the current pixels, blocks or MBs.

Figure 2:
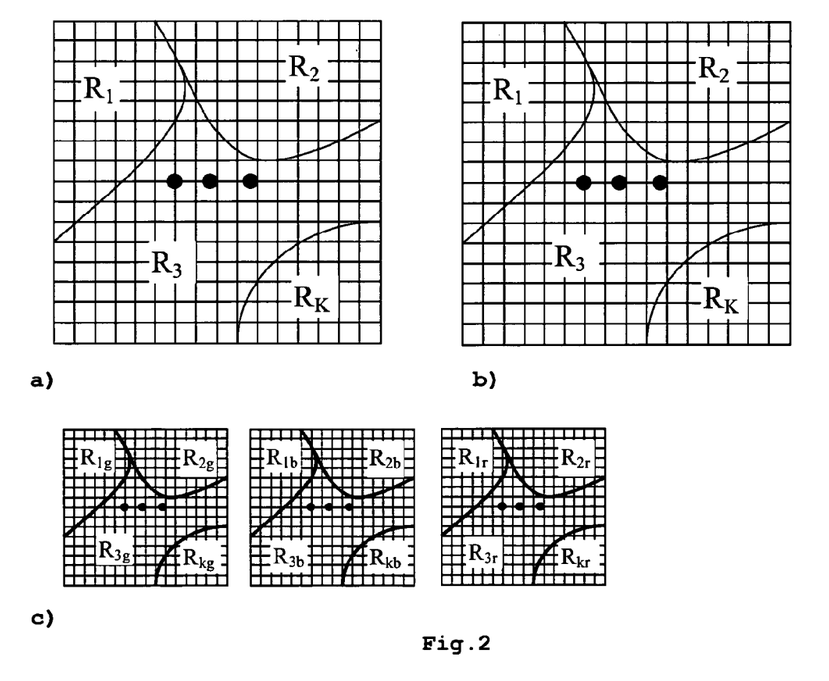
FIG. 2 texture segmented G, R and B colour planes of an exemplary 16×16 MB.

The current B MB is then separated into texture regions, ie. each pixel of the MB is associated with one region. This can be implemented e.g. by marking the regions with different region flags based on the different texture regions in the base colour plane. E.g. if a current G MB was separated into K regions after texture based segmentation, and each region was marked by an identifier $R_1, R_2, \ldots, R_k$, as shown in FIG. 2$a$), then in one embodiment shown in FIG. 2$b$) the corresponding B and/or R MB is separated into the same regions. In other embodiments the segmentation of the base colour plane is used as basis for incremental improvements in one or more other colour planes, which may require an additional simplified or complete texture analysis. In a simple embodiment, all colour planes re-use the segmentation of the base colour plane directly, such as the texture regions shown in FIG. 2$c$). E.g. a first region $R_1$ covers the same pixels in the G plane $R_{1g}$, the B plane $R_{1b}$ and the R plane $R_{1r}$.

Figure 3:
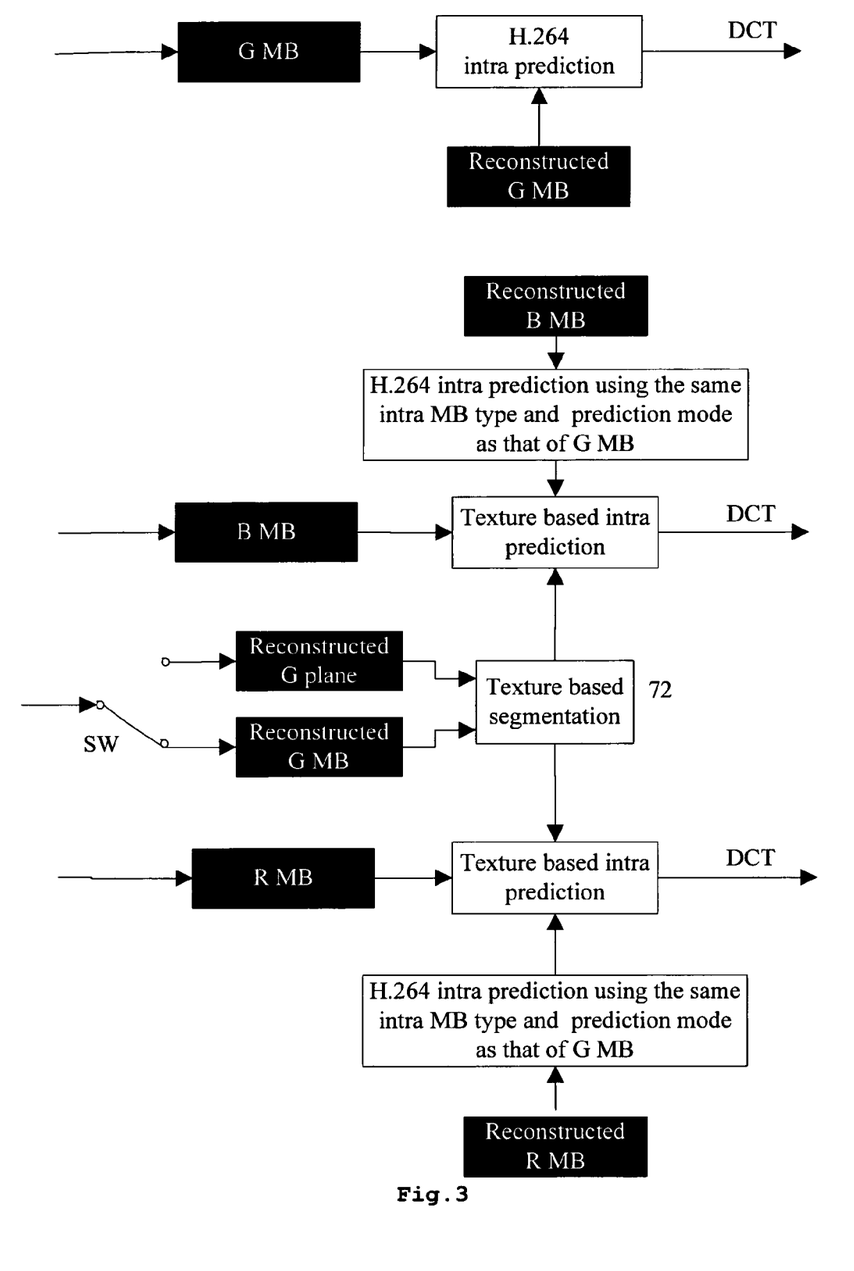
FIG. 3 a block diagram of encoding.

The proposed prediction scheme can be implemented on two or more levels alternatively, at least MB level (16×16 pixels) and frame level (frame size). FIG. 3 shows the block diagram of some aspects of the proposed inter-channel prediction architecture. E.g. G is selected as base colour plane, and a G MB is intra-coded using common H.264 intra prediction and then reconstructed. While the encoded MB is passed to further encoding steps, such as DCT, the reconstructed base colour plane is also input to texture based segmentation 72, which results in the above-explained regions. The texture based segmentation 72 gets as its input a MB or a full frame of the reconstructed base colour plane. In one embodiment, a switch unit SW is provided for selecting between different input portions. Then, the segmentation is applied to the other colour planes B, R, for which then texture based intra prediction is performed, as described below.

As mentioned above, the correlation between different colour planes is considered to be approximately linear. It is expressed by a linear relationship, which is used for linear prediction. Such linear relationship has the general form $$b = s*g + o \quad (1)$$

That means, the intensity of e.g. a blue pixel b can be expressed by the intensity of the corresponding green pixel g (which is a base colour plane pixel here), multiplied with a slope s and having an additive offset o. In encoding the blue pixel, a prediction is performed from the base colour plane with individual slope and offset values per region and predicted colour plane, e.g. $s_{b1}$ and $o_{b1}$ for a blue plane region denoted as "1". The blue pixel is then encoded by determining the residual, i.e. the difference between the predicted pixel and the actual pixel. For reconstruction of the blue pixel, it is sufficient to have the corresponding reconstructed base colour pixel, the residual and the slope and offset of the current segment.

Let b(i,j) and $b_p$(i,j) be the intensities of the original blue pixel and its predictor, respectively. The following linear model is used to predict pixel values of the current B MB:

$$b_p(i,j) = S_{B_k} \times g_{rec}(i,j) + o_{B_k} \quad (2)$$

where $g_{rec}$(i,j) is the reconstructed pixel of corresponding G MB. Here, $s_{Bk}$ and $o_{Bk}$ denote the slope and offset parameters of the linear model for $region_k$ in the current B MB. The residue energy J between the blue MB and its predictors is defined as $$J = \sum_{k=region_l}^{region_K} J_k \quad (3)$$

$$J_k = \sum\sum (b(i,j) - b_p(i,j))^2 \quad (4)$$
$$= \sum\sum (b(i,j) - (s_{B_k} \times g_{rec}(i,j) + o_{B_k}))^2,$$
with $(i,j) \, \varepsilon \, region_k$ where $J_k$ is the residue energy between pixels and their predictors of $region_k$ in the current blue MB. Minimized residue energy J can be attained by minimizing each $J_k$. By using partial differentiation to minimize $J_k$, optimal slope $s_{Bk}$ and offset $o_{Bk}$ are computed as $$s_{B_k} = \frac{\sum_{(i,j)\in region_k} (g_{rec}(i,j) - \overline{g_{reck}}) \times (b(i,j) - \overline{b_k})}{\sum_{(i,j)\in region_k} (g_{rec}(i,j) - \overline{g_{reck}})^2}, \quad (5)$$

$$o_{B_k} = \overline{b_k} - s_{B_k} \times \overline{g_{reck}}$$

where $\overline{b_k}$ and $\overline{g_{reck}}$ are respectively the means or averages of reconstructed green and blue pixels which belong to $region_k$.

No information about the number of texture regions or region borders of current blue MB needs to be transmitted to the decoder, since the same segmentation process (and the same region denomination algorithm) can be repeated on the reconstructed base colour component at the decoder. But both slopes and offsets of current blue MB seemingly need to be transmitted to the decoder, because they are not available at the decoder. In one embodiment, the slopes and offsets are transmitted to the decoder.

In another embodiment, to save the coding bits for offsets without degrading the accuracy of predictor, $\overline{b_{Hpk}}$ and $\overline{g_{Hpk}}$ are employed instead of $\overline{b_k}$ and $\overline{g_{reck}}$, respectively. Here, $\overline{b_{Hpk}}$ and $\overline{g_{Hpk}}$ is the mean value of pixel predictors produced by H.264 intra prediction of $region_k$ in current blue MB and corresponding green MB. Therefore, to get $\overline{b_{Hpk}}$, H.264 intra prediction has to be done before the proposed texture based intra prediction is done to the current blue MB. Unlike the G block, rate distortion optimization (RDO) is not needed for a B/R block, since due to texture distribution similarity between G and B/R component, it is supposed the B/R block uses the same MB mode and intra prediction modes as the corresponding G MB. So eq. (5) is rewritten as $$o_{B_k} = (\overline{b_{Hpk}} - s_{B_k} \times \overline{g_{Hpk}}) \quad (6)$$

Therefore, eq. (2) is redefined as $$b_p(i,j) = s_{B_k} \times g_{rec}(i,j) + (\overline{b_{Hpk}} - s_{B_k} \times \overline{g_{Hpk}}) \quad (7)$$

which is in one embodiment the linear model used to predict a B component from a G component using the proposed texture based inter-channel intra prediction.

Similarly, the predictor of a red component is obtained by:

$$r_p(i,j) = s_{R_k} \times g_{rec}(i,j) + (\overline{r_{Hpk}} - s_{R_k} \times \overline{g_{Hpk}}) \quad (8)$$

The final residue can be obtained by calculating the difference between original pixels and its predictors calculated by eq. (8). The following work after the intra-prediction is the same as the process described in H.264. Generally, the intra-prediction process can be applied to the different non-base-colour components sequentially or simultaneously.

Based on the above analysis, none of the MB type, intra prediction mode, or model offsets of a B/R MB has to be coded into the bit-stream, but only slopes of a B/R MB need to be transmitted to the decoder, which saves lots of coding bits. Here, offsets can be encoded into bits-stream as MB layer information.

Figure 4:
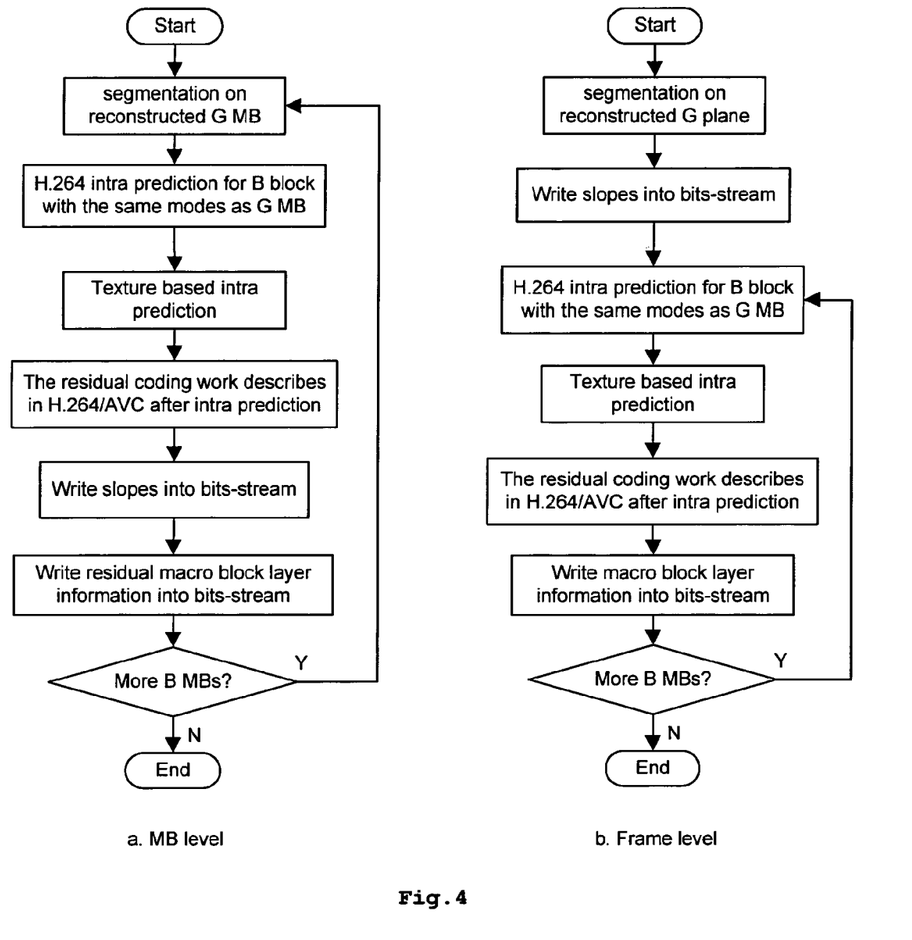
FIG. 4 a flow-chart for encoding a B plane on MB level or frame level.

In the following, an embodiment for prediction on frame level is explained. The proposed scheme on frame level is similar with that on MB level, as described above, wherein texture based segmentation is done to a base colour plane MB before encoding corresponding MBs of the other colour planes. On frame level, image segmentation needs to be done to a reconstructed base colour frame (e.g. G frame) before encoding the other colour planes. In FIG. 4b) the block size on frame level is the frame size, and the slopes information of a whole plane is encoded into the bits-stream as slice layer information. The flow processes of encoding a non-base colour plane (e.g. B plane) on MB level and frame level are shown in FIGS. 4a) and b).

In FIG. 4a) referring to MB level, the process begins with a segmentation of a reconstructed MB of the base colour plane (e.g. G plane). Then conventional H.264 intra prediction is performed, wherein an encoding mode is determined and used. For the corresponding B plane MB, the same encoding mode is used as was determined and used for the G plane MB. Then a texture based intra-prediction is done, as described before, and the resulting residual is conventionally encoded like in H.264/AVC. As a difference, also slopes are written into the output bit-stream. In one embodiment, also offsets are written into the bit-stream, while in another embodiment, residual data defining the offsets are written into the bit-stream, so that the offset can be generated at the decoder. Then the process reverts to the next B plane MB.

FIG. 4b) shows a flow-chart of an encoding process on frame level. After segmentation is done on the reconstructed base colour plane (i.e. whole image of e.g. G plane), the slopes are determined and written into the bit-stream. Each of the slope values is valid for a region of the complete image. Only then begins H.264 intra-prediction for the B plane, wherein for each MB the same encoding mode is used as was determined and used for the corresponding MB of the base colour plane. Remaining steps are as described above.

Although in the above examples always the G plane is used as the base colour plane, any colour plane can in principle be selected as base colour plane. Also the selection of second and third colour plane may be variable. An encoder comprises an implicit or explicit selector for selecting a base colour plane for an image unit, an image or an image sequence. That is, a colour plane may be pre-defined by definition or by control information (e.g. flag) to be the base colour plane, or one colour plane may be adaptively selected to be the base colour plane. Such adaptive selection analyzes 521,522 compares the available colour planes, preferably on frame level or sequence level, determines 523 a colour plane that has more texture regions, objects or edges than the others, and selects it as base colour plane, see FIG. 5b). Another colour plane that has less texture regions, objects or edges than the others is selected as "last" colour plane. For example, in one embodiment, a sequence that has a maximum of texture regions in the red colour plane and a minimum of texture regions in the blue colour plane can be encoded/decoded using R as base colour plane, G as second colour plane and B as third colour plane, with the B plane being predicted either from the R plane or from the G plane. Respective indications of the colour plane sequence order are encoded in the video signal. For the next sequence, the colour plane sequence order may be changed.

Figure 5:
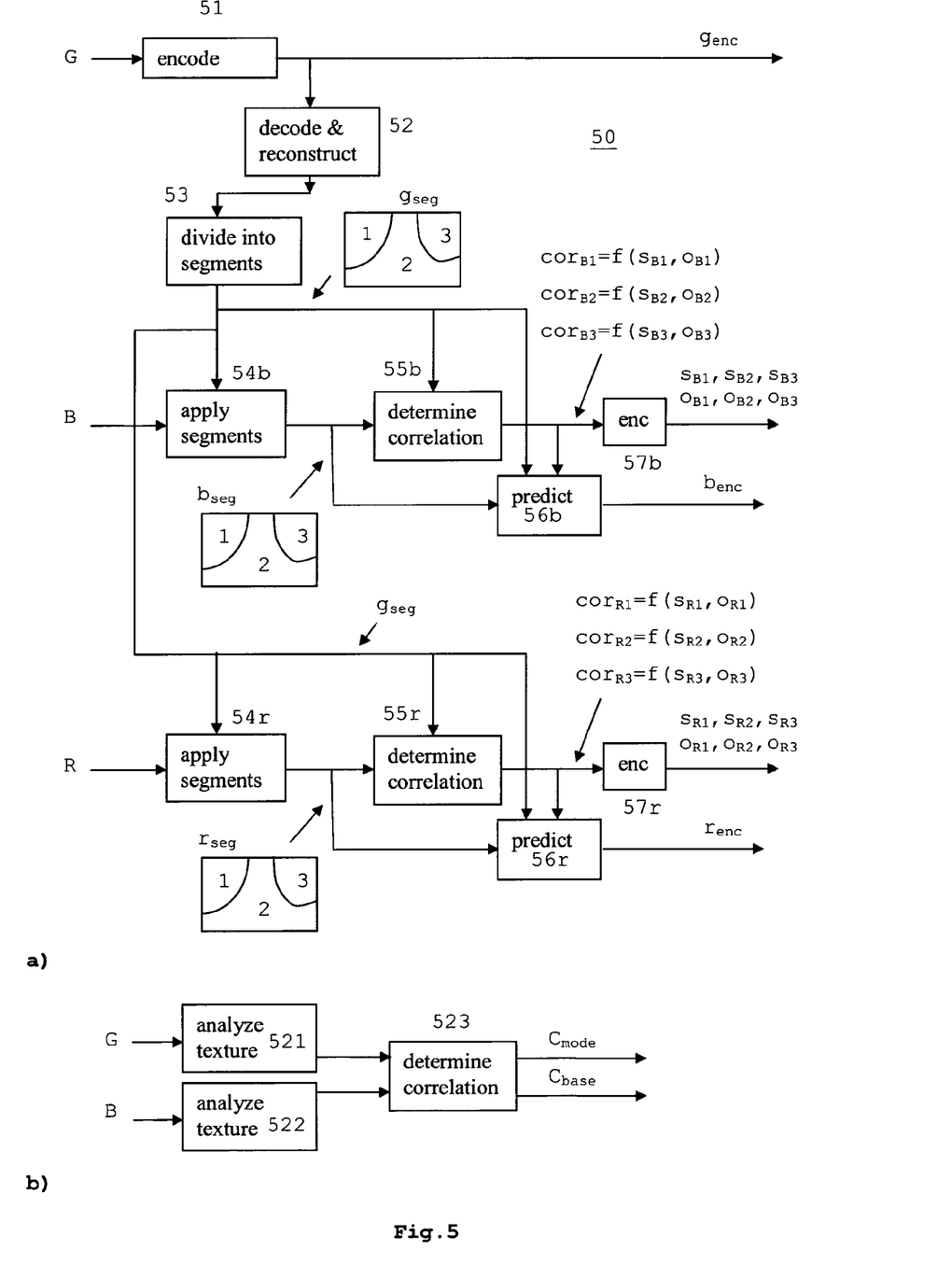
FIG. 5 the structure of an encoder.

FIG. 5a) shows a first embodiment of an encoder according to an aspect of the invention. The upper branch refers to the base colour plane, which is G here. The base colour plane is encoded in an encoder 51, and reconstructed in a reconstruction unit 52. While the encoded base colour plane $g_{enc}$ is ready to be output, the reconstructed base colour plane is provided to a segmentation unit 53 for performing texture segmentation on the reconstructed image unit's base colour plane, wherein at least two texture segments are determined. Then, separators 54b,54r apply the base colour plane segments for separating the other colour planes of the image unit into texture segments. In this applying, the texture segments that were determined for the base colour are directly re-used in one embodiment, or slightly modified in another embodiment that requires some additional region information to be transmitted (e.g. locations of pixels or pixel blocks that belong to different regions in the different colour planes).

A correlator 55b,55r determines, for each of the texture segments, a linear (luminance or intensity) correlation function between the reconstructed base colour plane and the original other colour plane. The linear correlation can be expressed by values that define it, such as slope and offset. In FIG. 5a), three correlation functions $cor_{B1}, cor_{B2}, cor_{B3}$ are found for three segments of the blue plane, and each is characterized by slope and offset parameters $s_{B1}, s_{B2}, s_{B3}, o_{B1}, o_{B2}, o_{B3}$. Similar results are obtained for the R plane. It is to be noted here that a linear correlation is usually only an approximation, however it has been found good enough to improve the prediction accuracy substantially.

Further, the encoder has a predictive coder 56b,56r that actually predicts pixels in a texture segment of the other colour plane of a current image unit from pixels of the corresponding texture segment of the base colour plane, and generates a residual picture. For the prediction, it uses the segmented colour plane image (e.g. the B plane input image and segment information for each MB), a correlation function per segment for the prediction, or the values that were obtained for this particular texture segment, and the reconstructed image of the base colour plane as a prediction reference. In one embodiment, the prediction for a particular segment is performed based on the values that define a linear correlation and that were obtained for this particular texture segment. In one embodiment, the encoder has a discriminator for determining a residual, e.g. a comparator for comparing the original pixels of the other colour plane with the predicted pixels and determining the difference as being a residual. Further, the encoder has an encoding unit 57b,57r for encoding the residual and information that defines the linear correlation, e.g. $s_{Bk}$, $\overline{b_{Hpk}}$ and $\overline{g_{Hpk}}$.

Figure 6:
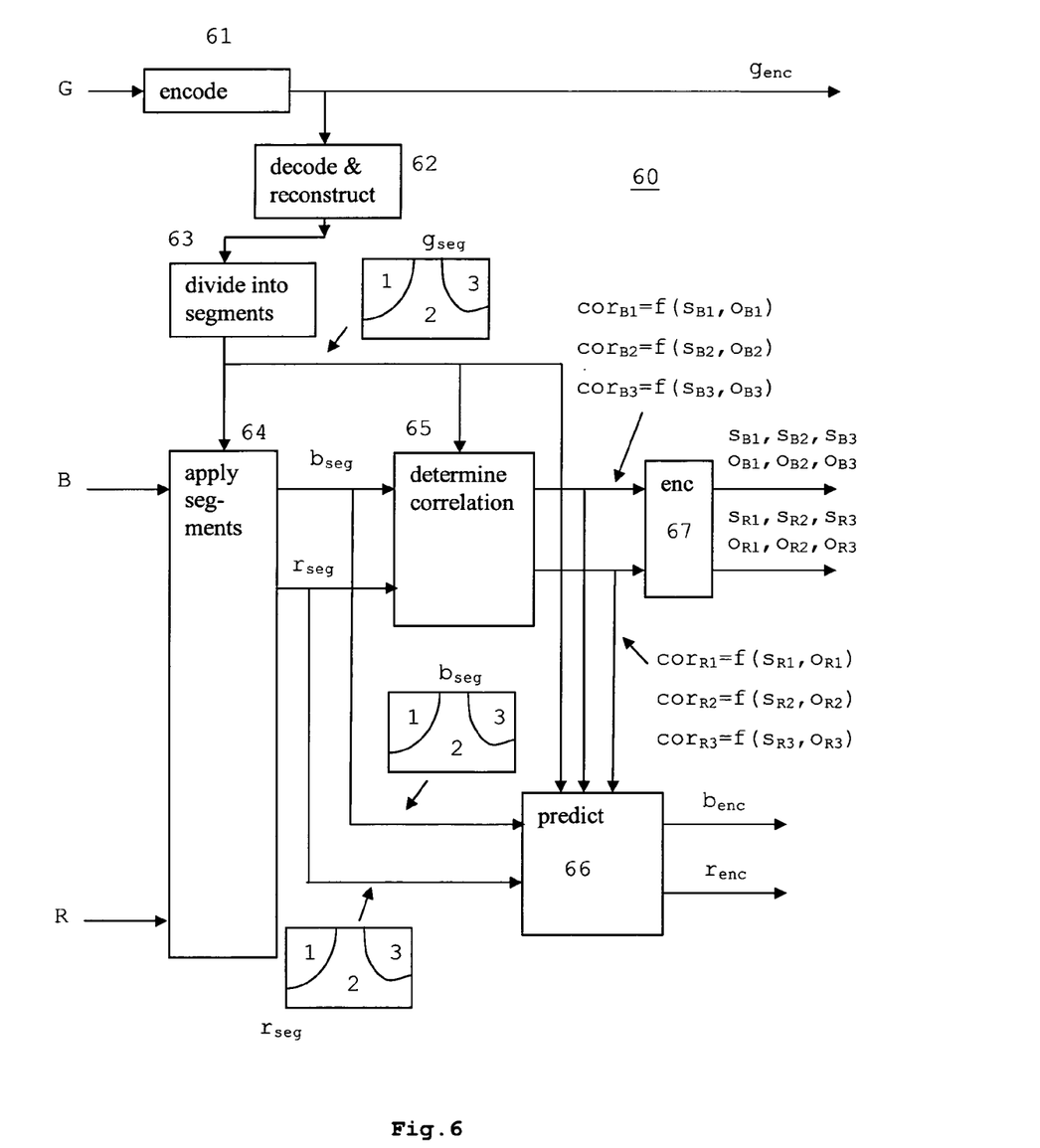
FIG. 6 the structure of an alternative encoder.

While the encoder shown in FIG. 5a) uses separate units for each colour plane, some units may be used for two or more different colour planes. The different colour planes may be processed simultaneously or sequentially. Depending thereon, some units or some modules within units may be saved. FIG. 6 shows a second embodiment of an encoder, where only one separator (multi-plane separator) 54 applies the base colour plane segments for separating two colour planes, a multi-plane correlator 65 performs the above-described correlation for each of the texture segments in two colour planes, a multi-plane predictive coder 66 predicts pixels in a texture segment of two colour planes and a multi-plane encoding unit 67 encodes the residual and information defining the linear correlation.

Figure 7:
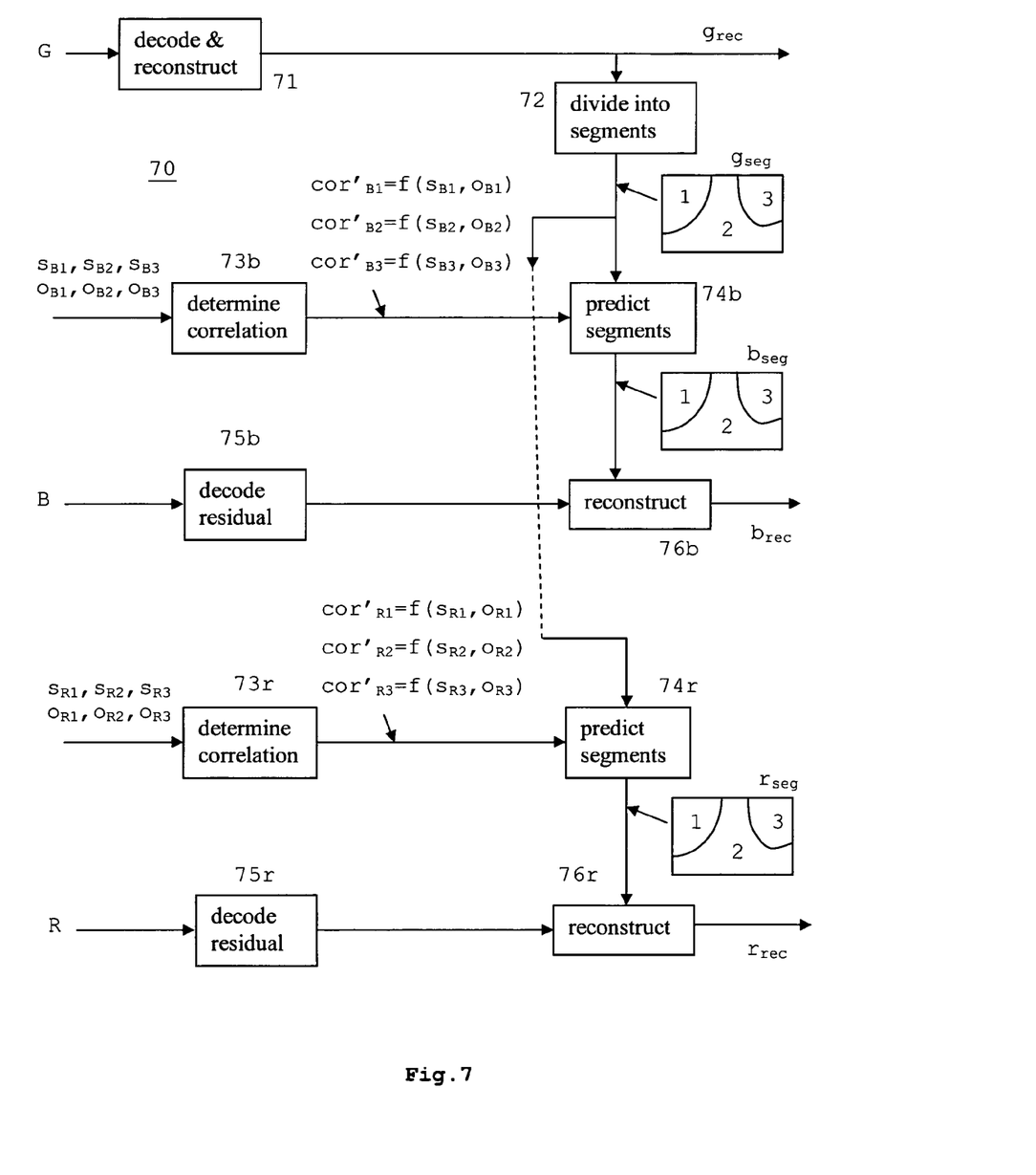
FIG. 7 the structure of a decoder.

In the following, a first embodiment of a decoder as shown in FIG. 7 is described. A first step (not shown in FIG. 7) is determining a base colour plane, either by selecting a predefined colour plane, looking-up the base colour plane in a configuration setup or evaluating an identifier received together with the video signal to be decoded. Thus, a base colour plane selector may be employed implicitly, or it may be an explicit unit. In this example, green G is the base colour plane. The received base colour plane is decoded and reconstructed in a decoding and reconstruction unit 71, as usual. In one embodiment, the decoding and reconstruction unit 71 is a conventional H.264/AVC intra decoder for a single colour plane. The reconstructed base colour plane a $g_{rec}$ is output for further processing steps, and is also divided into segments in a segmentation unit 72.

The obtained segments are the same that were obtained in the segmentation unit 53,63 on the encoder side, since the same segmentation algorithm and segment denomination algorithm is performed. In some embodiments, these algorithms are pre-defined. In other embodiments, the segmentation algorithm is adaptive, and parameters for defining or fine-tuning the algorithm are also received. Further, data relating to the other colour planes are received. For each colour plane, these data are at least residuals and parameters $s_{B1}, s_{B2}, s_{B3}, o_{B1}, o_{B2}, o_{B3}, S_{R1}, S_{R2}, S_{R3}, o_{R1}, o_{R2}, o_{R3}$ of a number of correlation functions. From these parameters, the respective correlation functions $cor_{B1}, cor_{B2}, cor_{B3}, cor_{R1}, cor_{R2}, cor_{R3}$ are re-configured in a correlation function generator 73b,73r, which determines the correlation functions from the parameters. In one embodiment, the received residuals are decoded e.g. in optional entropy decoders 75b,75r, while in another embodiment the residuals require no explicit decoding.

From the residuals, the base colour plane segmentation $g_{seg}$ and the correlation functions $cor_{B1}, \ldots, cor_{B3}$, the respective colour planes are reconstructed segment by segment in a reconstruction unit 76b,76r, using the respective correlation function for each segment.

Figure 8:
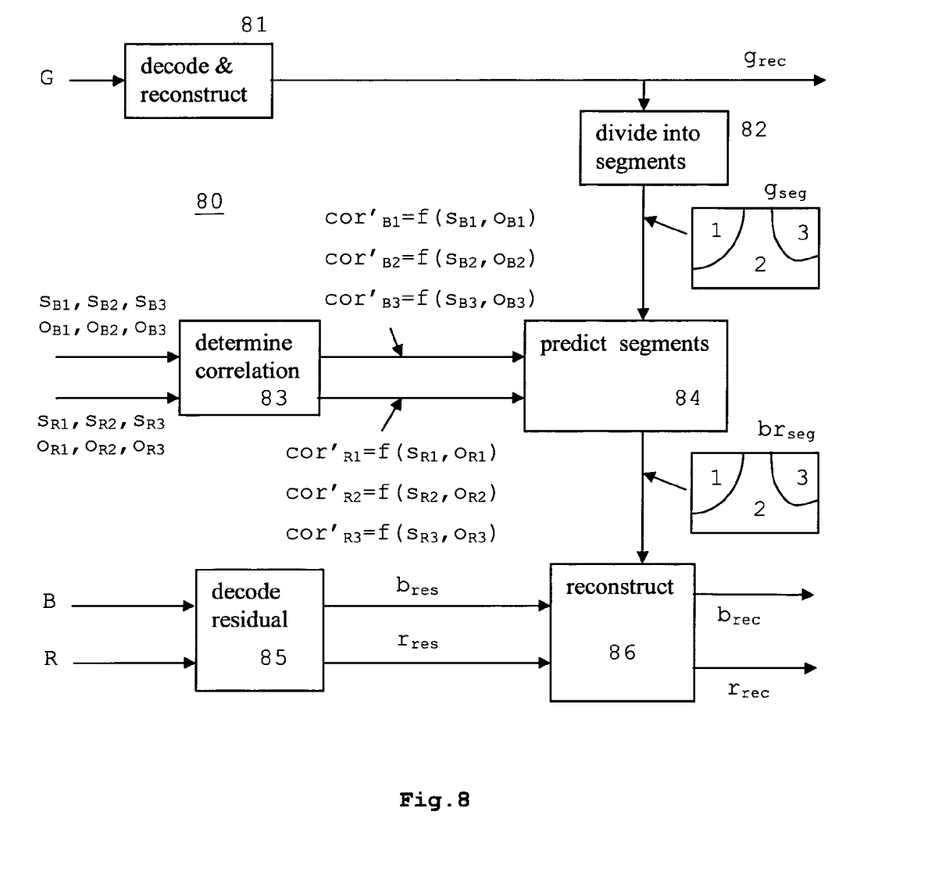
FIG. 8 the structure of an alternative decoder.

FIG. 8 shows a second embodiment of a decoder in which, for the same reasons as explained above, processing units or modules therein are shared between different colour planes.

In one embodiment, the segmentation map $g_{seg}$ of the base colour plane is used for both other colour planes $br_{seg}$, so that only one segmentation map is required as input to the reconstruction unit 86. In another embodiment, separate segmentation maps $b_{seg}, r_{seg}$ are used that may differ from each other, as explained above.

In one embodiment, the video encoder has delay elements, such as buffers, in order to delay the base colour plane output such that it is temporally correlated with the output of the other colour planes.

Similarly, in one embodiment, the video decoder has delay elements, such as buffers, in order to delay the base colour plane output such that it is temporally correlated with the output of the other colour planes.

In several embodiments, the encoding of the base colour plane uses intra-coding. In other embodiments, the encoding of the base colour plane may use inter-coding, e.g. based on base colour planes of other pictures. This may be earlier or later frames, images of different views etc.

Some embodiments comprise a final step of combining the encoded base layer and the one or more residuals into an encoded video signal.

Each of the embodiments described herein, including the following embodiments, can be used alone or in combination with any one or more other of the embodiments (unless the embodiments are different alternatives).

A decoder after decoding and reconstructing the base colour plane performs the same segmentation as the encoder, and comes to the same result. In one embodiment, no explicit segmentation information is therefore encoded or decoded.

In one embodiment, a predefined colour plane is used as base colour plane in the selecting step. In one embodiment, the predefined colour plane is the plane that typically includes more texture information than the other planes, such as the green (G) plane. In another embodiment, the base colour plane is adaptively selected, and the selecting of the base colour plane comprises texture analysis of at least two colour planes. The texture analysis comprises determining (luminance, intensity or texture) correlation among corresponding segments of the at least two colour planes.

In one embodiment, the other two colour planes of the image unit are separated into the same texture segments (i.e. segments with exactly the same coordinates) that were determined for the base colour. This simplification is applicable for most images and has the advantage that the segmentation needs to be done only for the base colour plane.

In another embodiment, the other two colour planes of the image unit are separated into similar but not exactly the same texture segments that were determined for the base colour. This can be achieved e.g. by refinement segmentation for the at least one colour plane that is not the base colour plane, wherein the base colour segmentation serves as a start for incremental improvements. Here, a higher compression rate may be achieved on the cost of additional processing effort.

In one embodiment, two or more texture segments of the base colour plane are combined into one for at least one of the other two colour planes of the image unit, so that less texture segments result than were determined for the base colour plane.

In one embodiment, the correlator may determine only linear correlations between the colour planes, and provides values that define such linear correlation. In another embodiment, the correlator may determine more complex correlations between the colour planes, and provide values that define such more complex correlation. In another embodiment, the correlator may determine also one of different correlation types, and additionally provide an indicator of the correlation type.

In one embodiment, the weight factor and offset of said correlation are obtained by minimizing the residue energy between the base colour segment and the corresponding segment of the other colour plane. In another embodiment, other methods are used for obtaining the weight factor and offset for a colour plane, e.g. re-use of values obtained from a temporally previous image, from an image of a different view or the like. The latter two embodiments may be combined, e.g. for different colour planes.

In one embodiment, each of the texture segments gets a region identifier assigned, wherein corresponding texture segments have the same region identifier. The region identifier can be used to indicate to which segment a block of encoded data in the output signal belongs.

In one embodiment, the information defining the weight factor and the offset comprises a slope value, a predictor $b_{HPk}, g_{HPk}$ and a residual of the offset $o_{B,k}$ per colour plane, wherein the offset is a prediction error based on said predictor $b_{HPk}, g_{HPk}$ and the base colour. In one embodiment, the slope value $s_{B,k}$ is included as layer control information, e.g. slice layer information, in the case of slice level, frame level or picture encoding.

In one embodiment, a first predictor $g_{HPk}$ is the mean value of pixels in a reconstructed base colour texture segment, and a second predictor $b_{Hpk}$ is the mean value of pixels in the corresponding texture segment of said other colour.

In one embodiment, texture segmentation is done with an edge detector and a simple region growing method. Any edge detection method can be used, wherein better edge detection results in a higher compression rate. In one embodiment, the Sobel operator is used for edge detection.

In one embodiment, a macroblock (MB) has 16×16 pixels. In another embodiment, a MB has more than 16×16 (or at least more than 8×8) pixels, wherein MBs need not be square.

One advantage of the invention is that no region information needs to be encoded or decoded, since the regions are implicitly given by executing during encoding and decoding the same texture segmentation on the reconstructed picture unit, e.g. MB.

The invention can be used not only for video encoding and decoding, but also in image demosiacing, a digital image process used to reconstruct a full colour image from the incomplete colour samples output from an image sensor, overlaid with a colour filter array. Further, the invention can be used for error concealment and data protection.

While there has been shown, described, and pointed out fundamental novel features of the present invention as applied to preferred embodiments thereof, it will be understood that various omissions and substitutions and changes in the apparatus and method described, in the form and details of the devices disclosed, and in their operation, may be made by those skilled in the art without departing from the spirit of the present invention. Although the present invention has been disclosed with regard to RGB colour planes, one skilled in the art would recognize that the method and devices described herein may also be applied to other types of colour planes that contain spatial redundancy. It is expressly intended that all combinations of those elements that perform substantially the same function in substantially the same way to achieve the same results are within the scope of the invention. Substitutions of elements from one described embodiment to another are also fully intended and contemplated.

It will be understood that the present invention has been described purely by way of example, and modifications of detail can be made without departing from the scope of the invention. Each feature disclosed in the description and, where appropriate, in the claims and/or drawings may be provided independently or in any appropriate combination. Features may, where appropriate be implemented in hardware, software, or a combination of the two. Connections may, where applicable, be implemented as wireless connections or wired, not necessarily direct or dedicated, connections. Reference numerals appearing in the claims are by way of illustration only and shall have no limiting effect on the scope of the claims.

The invention claimed is:

1. A method for video encoding separately for different colour planes on an image unit level, wherein an image unit is one of a macroblock, a frame and a picture, comprising
    selecting a base colour plane, encoding and reconstructing the image unit's base colour plane;
    performing texture segmentation on the reconstructed image unit's base colour plane, wherein at least two texture segments are determined;
    separating at least one other colour plane of the image unit into texture segments, using the texture segments that were determined for the base colour plane;
    for each of the texture segments, determining an intensity correlation between the reconstructed base colour plane and the at least one other colour plane, wherein a weight factor and an offset are obtained;
    based on said intensity correlation or said weight factor and offset obtained for a texture segment, predicting pixels in the texture segment of said at least one other colour plane from pixels of a corresponding texture segment of the reconstructed base colour plane, and determining a residual and encoding at least information defining the weight factor and the offset.

2. The method according to claim 1, wherein the encoding of the base colour plane uses intra-coding.

3. The method according to claim 1, further comprising a final step of combining the encoded base colour plane, the one or more residuals and the information defining the weight factor and the offset into an encoded video signal.

4. The method according to claim 1, wherein the weight factor and offset of said correlation are obtained by minimizing the residue energy between the base colour segment and the corresponding segment of the other colour plane.

5. The method according to claim 1, wherein the other colour planes of the image unit are separated into the same texture segments that were determined for the base colour.

6. The method according to claim 1, wherein the other colour planes of the image unit are separated into similar but not the same texture segments that were determined for the base colour.

7. The method according to claim 1, wherein at least one of the other colour planes of the image unit is separated into less texture segments than were determined for the base colour, wherein two or more texture segments of the base colour plane are combined into one.

8. The method according claim 1, wherein the information defining the weight factor and the offset comprises a slope value and at least one predictor per colour plane, the predictor being the mean value of pixel predictors as produced by intra prediction of the picture unit of the respective colour plane.

9. The method according to claim 8, wherein the offset of a colour plane is encoded by
$O_{B_k} = (\overline{b_{Hpk}} - s_{B_k} \times \overline{g_{Hpk}})$, wherein a first predictor is the mean value of pixels in the reconstructed base colour segment k, and a second predictor is the mean value of pixels in the corresponding segment k of said other colour.

10. The method for decoding video data being encoded on an image unit level separately for different colour planes, wherein an image unit is one of a macroblock, a frame and a picture, the method extracting from the encoded video data a first data block comprising data of an intra-coded base colour plane of the image unit;

extracting from the encoded video data a second data block comprising data of an encoded second colour plane of said image unit, and extracting from the encoded video data correlation data defining weight factors and offsets of at least two correlation functions;

intra-decoding the first data block, wherein a reconstructed base colour plane is obtained;

performing texture segmentation on the reconstructed image unit's base colour plane, wherein at least two texture segments are determined;

separating at least a second colour plane of the image unit into at least two texture segments, using the texture segments that were determined for the base colour plane;

for each of the at least two texture segments of the second colour plane, determining from said data defining a weight factor and an offset an intensity correlation function between the reconstructed base colour plane and the second colour plane;

predicting each of the at least two texture segments of the second colour plane from the respective texture segments of the base colour plane, using the respective correlation function determined for the segment; and reconstructing the image unit of the second colour plane, wherein residual data extracted from the second data block are combined with said predicted texture segments of the second colour plane.

11. A video coder for encoding colour planes separately on an image unit level, comprising a selector module for selecting a base colour plane for an image unit, an image or an image sequence, a codec for encoding and reconstructing the image unit's base colour plane, a segmentation module for performing texture segmentation on the reconstructed image unit's base colour plane, wherein at least two texture segments are determined, a separator module for separating at least one of the other colour planes of the image unit into texture segments, wherein the texture segments that were determined for the base colour are used, a correlator module for determining, for each of the texture segments, a correlation between the reconstructed base colour plane and the at least one other colour plane, wherein values are obtained that define a linear correlation, a predictive coder having a predictor for predicting pixels in a texture segment of said at least one other colour plane of the image unit from pixels of the corresponding texture segment of the base colour plane, based on said values that define a linear correlation and that were obtained for this particular texture segment, and having a discriminator for determining a residual, the discriminator comprising a comparator for comparing the original pixels of the other colour plane with the predicted pixels and determining the difference as being a residual, and an encoder for encoding the residual and information that defines the linear correlation.

12. A video decoder for video data being encoded on an image unit level separately for different colour planes, comprising a first extraction module for extracting from the encoded video data a first data block comprising data of an encoded base colour plane of the image unit;

a second extraction module for extracting from the encoded video data a second data block comprising data of an encoded second colour plane of said image unit; and a third extraction module for extracting from the encoded video data correlation data defining weight factors and offsets of at least two correlation functions;

a first codec for intra-decoding the first data block, wherein a reconstructed base colour plane is obtained;

a segmentation module for performing texture segmentation on the reconstructed image unit's base colour plane, wherein at least two texture segments are determined;

a segmentation applying module for separating at least a second colour plane of the image unit into at least two texture segments, using the texture segments that were determined for the base colour plane;

a intensity correlation determining module for determining, for each of the at least two texture segments of the second colour plane, from said data defining a weight factor and an offset an intensity correlation function between the reconstructed base colour plane and the second colour plane;

a prediction module for predicting each of the at least two texture segments of the second colour plane from the respective texture segments of the base colour plane, using the respective correlation function determined for the segment; and a reconstructing module for reconstructing the image unit of the second colour plane, wherein residual data extracted from the second data block are combined with said predicted texture segments of the second colour plane.

\* \* \* \* \*